Patented Feb. 8, 1944

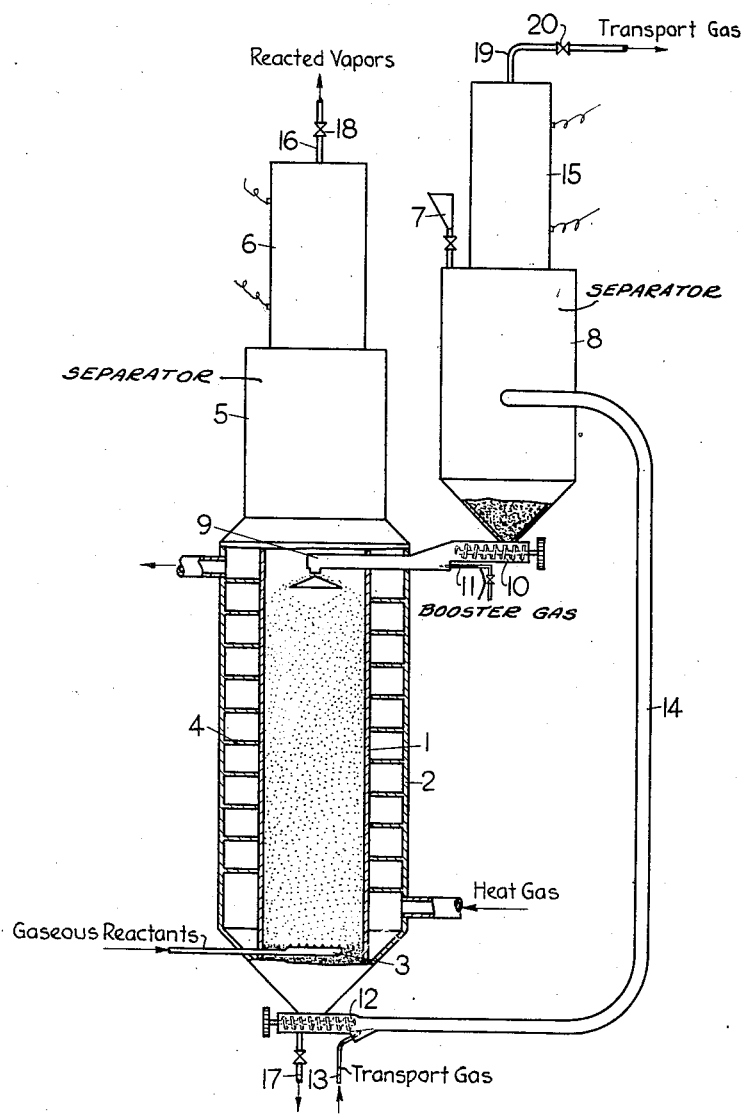

2,340,878

UNITED STATES PATENT OFFICE 2,340,878

METHOD FOR EXECUTING VAPOR PHASE REACTIONS

Benjamin Merrill Holt and George Edward Liedholm, Long Beach, Calif., assignors to Shell Development Company, San Francisco, Calif., a corporation of Delaware Application December 23, 1939, Serial No. 310,678

5 Claims. (Cl. 196—52)

The present invention relates to a process for executing vapor phase reactions with the aid of solid catalysts. One particular aspect of the invention relates to the catalyzation of endothermic vapor phase reactions. Other more particular aspects of the invention relate to catalytic hydrocarbon treatments such, in particular, as dehydrogenation, isomerization, cyclization, reforming, desulfurization and cracking.

The efficient execution of vapor phase reactions at elevated temperatures with the aid of heterogeneous catalysts presents, in general, a very difficult and complicated problem. The most obvious and most commonly used method of executing such reactions is to support the catalyst in the form of granules or pills in a suitable reactor maintained at the desired temperature by external heating or cooling means and to pass the gases to be reacted therethrough at a suitable desired rate and under a suitable pressure. While this method is satisfactory for the execution of certain reactions, it has numerous disadvantages which detract very much from its general usefulness. One of the foremost disadvantages of these methods employing a fixed bed of catalyst is due to the necessity of frequently reactivating the catalyst. In all such processes the catalyst gradually loses its activity during processing, in many cases in a few minutes, and must be reactivated. This necessitates operating the process intermittently and causes numerous complications. The disadvantages caused by the reactivation treatment, as well as certain other disadvantages inherent in these methods employing fixed catalyst beds, are particularly pronounced in the execution of endothermic reactions at elevated temperatures, especially when treating hydrocarbons.

It has also been proposed to execute certain vapor phase reactions in an entirely different manner by dispensing with the fixed bed of catalyst and introducing the catalyst into the reaction chamber in a finely divided state. Although these proposed methods possess certain decided advantages over the methods employing fixed catalyst beds and can be economically employed for certain reactions, particularly inorganic exothermic reactions such as in the production of sulfuric acid, etc., they leave much to be desired and have not proven to be practical for the large majority of vapor phase reactions.

We have investigated the application of finely divided catalysts in the catalyzation of vapor phase reactions both from the theoretical as well as the practical standpoint and have discovered that one of the chief causes for the failure of the hitherto proposed methods lies in the inability to provide suitable effective contact between the catalyst and gaseous reactants under the desired reaction conditions. In the hitherto proposed methods it is necessary, except in a few special cases, to employ less favorable reaction conditions, such as higher temperatures, higher pressures, etc., in order to effect the desired reactions and the results are consequently inferior or too poor for practical consideration.

We have also discovered a new and improved method of executing vapor phase reactions wherein the disadvantages of the hitherto proposed processes are largely overcome. The method of our invention, unlike the hitherto proposed methods, is applicable in the execution of catalyzed vapor phase reactions in general, and is particularly advantageous for the execution of endothermic reactions, such, in particular, as are encountered in most catalytic hydrocarbon treatments. In the method of our invention the vapors to be reacted are passed upwardly through a reaction zone at a velocity not exceeding that of free fall of the finely divided catalyst and are contacted therein under suitable reaction conditions with downwardly falling finely divided catalysts. In this method of operation, by adjusting the rate of flow of the gaseous reactants and/or the size of the catalyst particles, the effective contact between the gaseous reactants and the catalyst may be increased, lower gas velocities allowing more advantageous transfer of heat may be employed, the amount of catalyst to be handled may be considerably reduced, catalyst recovery from the reacted gases may be considerably simplified, and other advantages of a practical nature may be realized.

Certain details of the present method of operation may be conveniently explained in connection with the description of an operation comprised within the scope of the invention. To assist in the description the attached drawing has been provided which shows by means of conventional figures, not drawn to scale, an arrangement of elements in which our method may be employed. Referring to the drawing, 1 represents a reaction chamber provided with a heating means 2 which in the present instance is a surrounding jacket in which hot gases are made to pass in a spiral path by a spiral partition 4. Instead of the heating means shown, any other suitable type of heating means may be applied. For instance, the reaction chamber may be penetrated either vertically, horizontally or spirally with coils or pipes containing a heating medium, or if desired, the chamber may be heated by electrical heating elements or by induction, and in many cases the necessary heat may be supplied by the gaseous reactants or a heat carrier gas, and separate heating of the reaction chamber may be dispensed with. In such cases when the process under consideration is endothermic and is carried out at relatively high temperatures, for instance from 200 to 700° C., the apparatus is preferably properly insulated. Insulation of the apparatus, being an optional detail has not been shown in the drawing. When executing exothermic reactions it is often necessary to substitute a cooling medium, such as cool gas, water, oil, or the like, for the heating medium.

For the execution of most processes, the reaction chamber 1 may be constructed of conventional materials. When treating hydrocarbons at elevated temperatures it is preferable to construct the reaction chamber 1 of, or line it with, one of the many materials that do not promote the formation of carbon, since carbon, once formed, can only be removed manually or by the eroding action of the catalyst or by a periodic burning off with air. Very suitable materials for the construction and lining of the reaction chamber are, for example, high chrome low nickel ferritic steels, chromium plating, ceramic lining, Gunnite lining, and the like.

The reaction chamber 1 is directly connected in the direction of gas flow with a device for separating entrained catalyst particles. In the drawing such a device is designated at 5. The separator 5 may be of any conventional type such as the conventional cyclone type and those relying upon baffles, sieves, filters, electrical precipitation, and the like.

In the present method of operation, since relatively low gas velocities generally prevail, a single small device for separating solid catalyst from the exit reacted gas is often ample. In the present instance, however, for the sake of completeness, the main separator 5 is supplemented by a second separator 6 wherein any last traces of catalyst are removed by electrical precipitation. These separators are very efficient and are capable of economically removing the last traces of suspended solids from large quantities of gases.

In the dehydrogenation of butane, for example, one of the common dehydrogenation catalysts, such as a dehydrogenating metal oxide supported on a finely divided carrier material, is charged to the system via a suitable inlet, such as at 7, in a loose finely divided form. The catalyst from the separating device 8 is continuously introduced into the upper portion of the reaction chamber 1 in a loose dispersed state via a suitable inlet, such as the orifice with cone shown at 9. The introduction of the catalyst may be effected in any one of several ways: as shown in the drawing, the catalyst is continuously fed from separator 8 at the desired rate by a screw device 10. If desired, instead of a screw device, a star or pocket type rotary feeder may be used. It is sometimes advantageous, for instance in such cases where the catalyst is extremely finely divided and has a tendency to pack, to inject a small stream of gas in order to counteract any tendency for the catalyst to pack and to provide a more even and dispersed introduction of the catalyst. Such a booster gas supply is shown in the drawing at 11. Any gas which is not detrimental in the reaction may be used for this purpose; however, it is usually preferable to employ either a portion of the reacted vapors or of a reactant gas. In any case, however, the quantity of gas introduced with the catalyst, if any, should be maintained relatively small compared to the quantity of gas treated in order not to disturb the desired flow in the reaction chamber.

The catalyst introduced into the upper portion of the reaction chamber descends therein countercurrent to the reactant gases and collects in the lower portion of the chamber from where it is continuously withdrawn by a suitable device such as a screw mechanism 12 and is returned to the catalyst supply in 8.

In the preferred embodiment of the invention the transportation of the catalyst from the bottom of the reaction chamber to the supply in 8 is effected pneumatically. Although other means may be employed, pneumatic transportation of the catalyst has several advantages which make it most desirable in the present process. The catalyst, when transported, pneumatically, are not pressed, ground and packed as with mechanical devices, but are found to be loose and aerated. It appears that during pneumatic transportation the catalyst particles dispersed in the transport gas acquire an electrical charge and/or an adsorbed gas cushion which tends to prevent direct contact of the particles with one another and with the container walls. This tends to prevent agglomeration and packing, facilitates the introduction of an even and dispersed feed of catalyst into the reaction chamber, tends to lessen friction, and also tends to minimize catalyst degradation and erosional wear. Due to the considerable electrical charge which may be developed, the apparatus should preferably be well grounded. In the apparatus shown in the drawing, the catalyst withdrawn from the reaction chamber by the screw device 12 is continuously picked up by a jet of gas, for instance air entering via 13, and is transported therewith via a tube 14 having an appropriate cross section and well-rounded turns to another conventional separating device 8 wherein the catalyst is separated from the transport gas. Separator 8 may also, if desired, be augmented by an electrical precipitator 15 to recover any last traces of catalyst. The screw devices 12 and 10, as well as any other portions of the apparatus which may be subjected to considerable erosion by the catalyst, are preferably faced with erosion-resistant materials such as "Stellite" or "Hascrome."

The material to be treated is preheated to the desired temperature in any suitable manner (preheater not shown) and is injected into the lower portion of the reaction chamber by one or a plurality of nozzles 3 at such a rate that the vapors passing up through the reaction zone travel at a velocity not greater than the rate of free fall of the catalyst. In the usual operation of the process the catalyst nearly all remains below the point of its injection and only a small amount of extra fine material is carried up with the reacted vapors into the separators 5 and 6. After being freed of any suspended catalyst, the reacted vapors leave the system via outlet 16. In certain cases where a very long contact time is required for the efficient execution of the reaction, for instance in the reforming of certain refractory hydrocarbon distillates, it may be desirable to treat the vapors more than once.

The temperature in the reaction zone, may be closely regulated, according to the present method, by regulating the temperature of the incoming gases or by regulating the amount of heat supplied to the heater 2, or both.

The present method of executing vapor phase reaction is exceptionally advantageous in view of the control and wide range of effective contacts which may be realized. Thus, the amount of effective contact may be regulated either by the length of the reaction chamber, by the rate of flow of the reactants, by the size of the catalyst particle, or by the rate of feed of the catalyst in weigh per unit of time. By employing very finely divided catalysts (for example, having an average particle size of 1-5 microns) in ample amounts and employing a low feed rate of reactant vapors, excellent effective contact may easily be obtained. Thus, the present method is especially suited for carrying out various catalytic hydrocarbon treatments and other reactions where longer times of contact are advantageous.

In the dehydrogenation of butane at 1050° F. with a particular 80–100 mesh $Cr_2O_3$—$Al_2O_3$ catalyst to obtain a 30% conversion to olefins, the relation between the contact time in seconds ($t$) and amount of catalyst in lbs./cu. ft. of flowing vapor ($c$) was determined to be approximately $$ct = 50$$

The contact time required for the catalytic reforming or cracking of a cracked stove oil, on the other hand, is considerably greater. Thus, when operating at 1000° F. to give a 30% yield of 380° F. end point gasoline per pass, this relation is approximately $$ct = 220$$

In spite of the varied conditions required for these two processes, they may be both advantageously operated according to the present method and even in the same apparatus. The method is, moreover, also advantageous for the executing other more simple reactions such as various inorganic exothermic reactions. When applied in these processes much coarser catalysts may sometimes be employed (for instance even up to 20–30 mesh) and comparatively small quantities of catalyst are usually sufficient.

The present method is well-suited for general application and may be advantageously applied in any vapor phase reaction which may be catalyzed by a finely divided solid catalyst. Due to the low space velocities which, if desired, may be employed according to the present method and to the less drastic heating required therewith, the method of our invention is especially advantageous for executing endothermic reactions. Particular processes for which the method is well-adapted are, for example, the dehydrogenation, isomerization, cyclization, reforming of a hydrocarbon distillate boiling in the gasoline boiling range, desulfurization and cracking of hydrocarbons and vaporizable hydrocarbon mixtures. The temperatures, pressures, catalysts, and other conditions preferred for these various processes are well-known and may be found in numerous patents and scientific articles.

The catalysts employed in the present method are preferably in a finely divided state and should be solid and free-flowing. The various catalysts may be prepared in a suitable finely divided state for use in the process, or they may be first prepared in the ordinary manner and subsequently crushed or ground to the desired degree of fineness. The compositions of the various catalysts will depend, of course, upon the particular process under consideration. In general, any of the many solid catalysts commonly employed in these processes may be ground or crushed and applied according to the present method. In such cases where the catalyst comprises one or more metals or metal compounds supported on a carrier material, it is usually desirable to choose a carrier material which is capable of withstanding repeated use with a minimum of degradation. Alumina and various aluminum silicates are especially suitable. Thus a metal oxide, for example chromium oxide, may be deposited in one of these materials, for example crushed active alumina. These catalysts which are light in weight, adsorbent and strong, may be used in various hydrocarbon treatments such as dehydrogenation, cyclization, etc. For the isomerization of olefinic hydrocarbons finely divided zeolites and permutites are excellent. In hydrocarbon cracking any one of the various siliceous cracking catalysts may be employed.

During use in the process, the catalysts gradually loses its activity. Also, there is some degradation of the catalyst particles due to attrition. In many cases it may be desirable to recycle a given charge of catalyst until its activity has depreciated, to withdraw the spent catalyst, and to repeat the operation with a fresh catalyst charge. In other cases it may be desirable to subject a portion or even all of the recycled catalyst to a suitable reactivation treatment. Withdrawal of catalyst from the system for a special reactivation treatment or for any other reason may be made by means of an outlet such as shown at 17. Alternatively, a conventional means for reactivating a portion or all of the catalyst may, if desired, be inserted in the catalyst circuit, preferably between the screw device 12 and separator 8. Also, in some cases it may be desirable to continuously or intermittently remove a portion of the extra fine material produced by attrition and add an equivalent amount of fresh catalyst of more desirable particle size. This may easily be done by switching off the electrical precipitator 15 and applying a sufficiently forceful blast of gas via 13 to carry the extra fine material out of the system with the exit transport gas.

When employing these various catalysts according to the present method it is essential that the reaction be executed in the substantial absence of a liquid phase. Thus, particularly when treating various hydrocarbons and hydrocarbon fractions, the feed should be completely vaporized before its introduction into the reaction chamber. This condition may usually be maintained simply by preheating the feed; in certain cases, however, for instance when cracking heavy hydrocarbon fractions, it is desirable to first vaporize and dilute the feed with steam.

In certain cases, especially in certain hydrocarbon treatments, it is desirable to operate in the presence of a gas such as hydrogen in order to inhibit undesirable side reactions. In the present method of executing these processes such inert gas may be either injected hot or cold into the lower portion of the reaction chamber by a separate inlet (not shown) or in admixture with the reactant vapors, or may be injected into the upper portion of the reaction chamber in small quantities as a booster gas with the catalyst. If it is desired to execute the process under pressure, this may be easily done by throttling the outlet pipe (valve 18) and preferably also the outlet for the transport gas 19 by a valve 20. In this manner considerable pressure (for instance up to about 10 atm.) may be employed without difficulty.

While we have described our invention in its preferred embodiment and have indicated certain variations comprised within its scope, we are aware that numerous modifications will be readily apparent to those skilled in the art. It is to be understood, therefore, that all such modifications are intended to be included and that no limitations are intended other than those imposed by the scope of the appended claims.

We claim as our invention:

1. In a process for reforming hydrocarbon distillates with the aid of a finely divided catalyst, the steps comprising passing preheated vapors of a hydrocarbon distillate to be reformed under reforming conditions up through a reaction zone in the substantial absence of a liquid phase in countercurrent contact with a dry aerated free-falling finely divided reforming catalyst, feeding aerated solid finely divided catalyst without substantial addition of gas into the top of said reaction zone, withdrawing substantially dry finely divided catalyst collected in a dense phase from the bottom of said reaction zone, aerating said withdrawn catalyst with a separate gaseous medium and simultaneously transporting it outside of said reaction zone to complete a cycle, separating the aerated catalyst outside of said reaction zone from the transport medium, and continuously rcycling the separated aerated finely divided catalyst to the reaction zone.

2. In a process for cracking hydrocarbons with the aid of a finely divided catalyst, the steps comprising passing preheated hydrocarbon vapors to be cracked under cracking conditions up through a reaction zone in the substantial absence of a liquid phase in countercurrent contact with a dry aerated free-falling finely divided siliceous cracking catalyst whereby cracking takes place with absorption of heat, feeding aerated solid finely divided catalyst without substantial addition of gas into the top of said reaction zone, withdrawing substantially dry finely divided catalyst collected in a dense phase from the bottom of said reaction zone, aerating said withdrawn catalyst with a separate gaseous medium and simultaneously transporting it outside of said reaction zone to complete a cycle, separating the aerated catalyst outside of said reaction zone from the transport medium, and continuously recycling the separated aerated finely divided catalyst to the reaction zone.

3. In a process for dehydrogenating hydrocarbons in the vapor phase with the aid of a finely divided catalyst, the steps comprising passing preheated vapors of a hydrocarbon to be dehydrogenated under dehydrogenating conditions up through a reaction zone in the substantial absence of a liquid phase in countercurrent contact with dry aerated free-falling finely divided dehydrogenation catalyst whereby dehydrogenation takes place with absorption of heat, feeding aerated solid finely divided catalyst without substantial addition of gas into the top of said reaction zone, withdrawing substantially dry finely divided catalyst collected in a dense phase from the bottom of said reaction zone, aerating said withdrawn catalyst with a separate gaseous medium and simultaneously transporting it outside of said reaction zone to complete a cycle, separating the aerated catalyst outside of said reaction zone from the transport medium, and continuously recycling the separated aerated finely divided catalyst to the reaction zone.

4. In a process for executing endothermic reactions in the vapor phase with the aid of a finely divided catalyst, the steps comprising passing preheated vapors to be reacted under suitable reaction conditions up through a reaction zone in the substantial absence of a liquid phase in countercurrent contact with dry aerated free-falling finely divided catalyst whereby reaction takes place with absorption of heat, feeding aerated solid finely divided catalyst without substantial addition of gas into the top of said reaction zone, withdrawing substantially dry finely divided catalyst collected in a dense phase from the bottom of said reaction zone, aerating said withdrawn catalyst with a separate gaseous medium and simultaneously transporting it outside of said reaction zone to complete a cycle, separating the aerated catalyst outside of said reaction zone from the transport medium, and continuously recycling the separated aerated finely divided catalyst to the reaction zone.

5. In a process for executing endothermic conversions of hydrocarbons in the vapor phase with the aid of a finely divided catalyst, the steps comprising passing preheated hydrocarbon vapors to be converted under suitable conversion conditions up through a conversion zone in the substantial absence of a liquid phase in countercurrent contact with dry aerated free-falling finely divided catalyst whereby conversion takes place with absorption of heat, feeding solid finely divided catalyst without substantial addition of gas into the top of said conversion zone, withdrawing substantially dry finely divided catalyst collected in a dense phase from the bottom of said conversion zone, aerating said withdrawn catalyst with a separate gaseous medium and simultaneously transporting it outside of said conversion zone to complete a cycle, separating the aerated catalyst outside of said conversion zone from the transport medium, and continuously recycling the separated aerated finely divided catalyst to the conversion zone.

BENJAMIN MERRILL HOLT.
GEORGE EDWARD LIEDHOLM.